No. 646,193. Patented Mar. 27, 1900.
A. P. ROBINSON.
VEHICLE RUNNING GEAR.
(Application filed Nov. 20, 1899.)
(No Model.) 2 Sheets—Sheet 1.
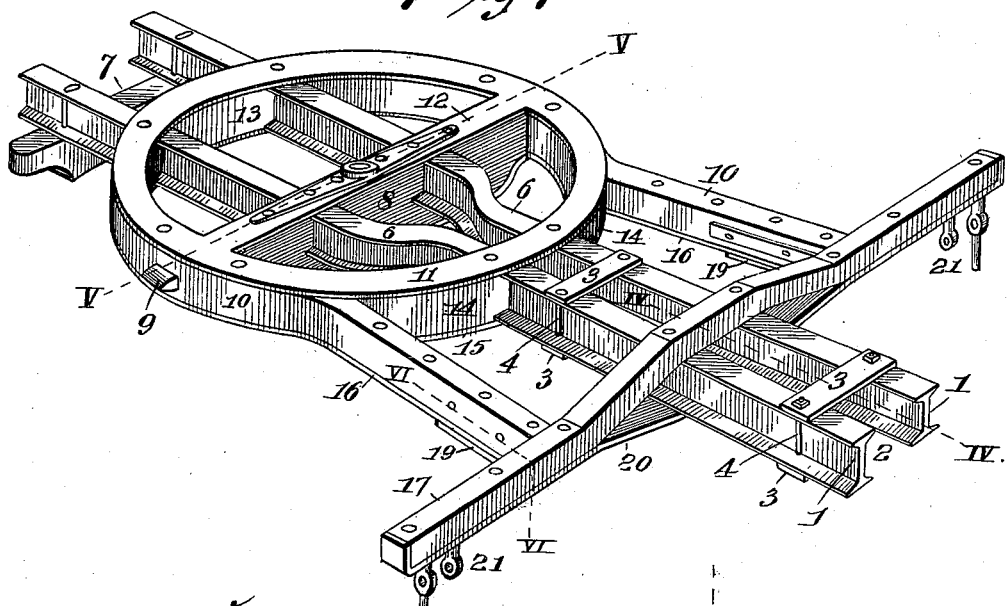
Fig. I.
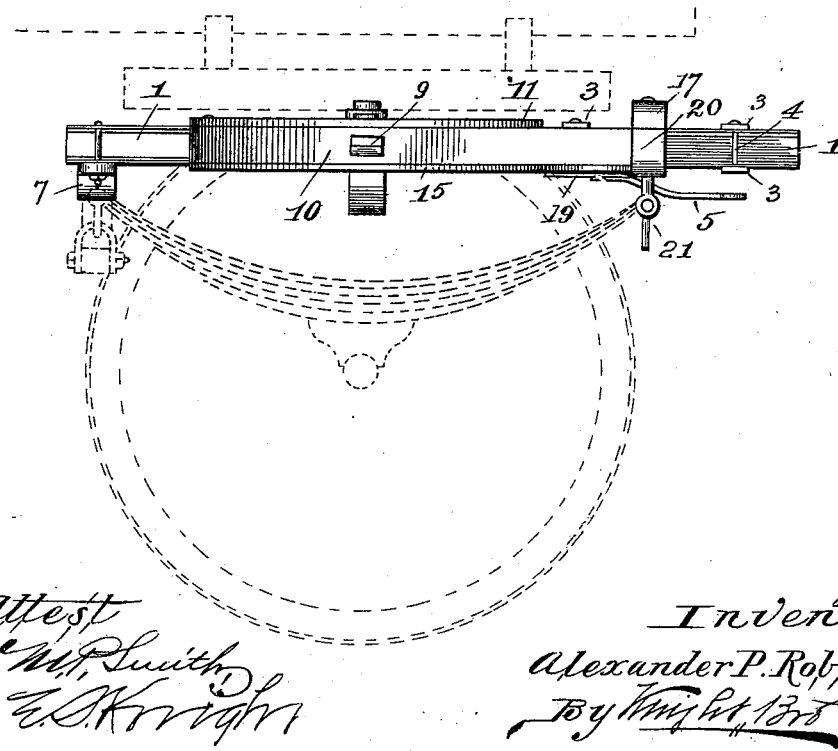
Fig. II.
Attest:
W. P. Smith
E. C. Knight
Inventor:—
Alexander P. Robinson.
By Knight Bros. Atty's.
THE NORRIS PETERS CO., PHOTO-LITHO., WASHINGTON, D. C.

No. 646,193. Patented Mar. 27, 1900.
A. P. ROBINSON.
VEHICLE RUNNING GEAR.
(Application filed Nov. 20, 1899.)
(No Model.) 2 Sheets—Sheet 2.
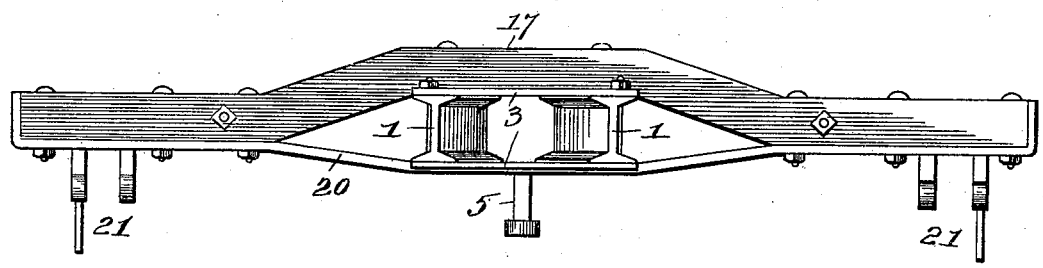
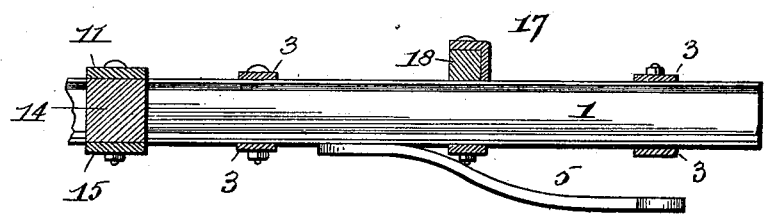
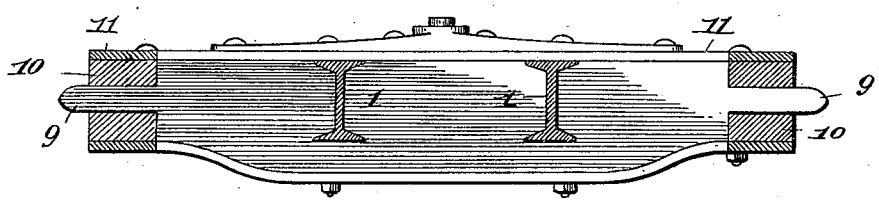
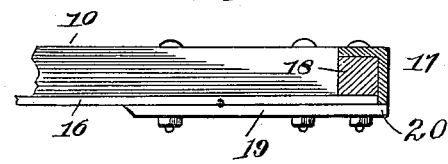
Inventor:
Alexander P. Robinson

UNITED STATES PATENT OFFICE.

ALEXANDER P. ROBINSON, OF WEBSTER GROVE, MISSOURI.

VEHICLE RUNNING-GEAR.

SPECIFICATION forming part of Letters Patent No. 646,193, dated March 27, 1900.

Application filed November 20, 1899. Serial No. 737,543. (No model.)

*To all whom it may concern:*

Be it known that I, ALEXANDER P. ROBINSON, a citizen of the United States, residing at Webster Grove, in the county of St. Louis and State of Missouri, have invented certain new and useful Improvements in Vehicle Running-Gears, of which the following is a full, clear, and exact description, reference being had to the accompanying drawings, forming part of this specification.

My invention relates to running-gears designed for service in that type of vehicles known as "platform-spring wagons."

The object of the invention is to simplify the construction and increase the rigidity and strength of running-gears of the kind named.

My invention consists in features of novelty hereinafter fully described, and pointed out in the claim.

Figure I is a perspective view of my improved gear. Fig. II is a side view of the gear, the correlative parts of the vehicle being shown in dotted lines. Fig. III is a front view of the gear. Fig. IV is a sectional view taken on the line IV IV, Fig. I, and showing one of the longitudinal I-beams in side elevation. Fig. V is a cross-sectional view taken on the line V V, Fig. I. Fig. VI is a detail view of one of the side rails connecting the fifth-wheel and the forward-spring-supporting cross-beam, the cross-beam being shown in section, taken on the line VI VI, Fig. I.

1 1 designate I-beams that extend longitudinally of the vehicle parallel with each other at their rear ends, the forward ends of which beams provide a crotch-socket 2 for the reception of the wagon-tongue, which is sustained between the flanges of the I-beams. The I-beams are connnected together at their forward ends by tie-straps 3, above and below them, joined by bolts 4.

5 is a strap secured to the under sides of the I-beams, having its forward end perforated and adapted to receive the doubletree, which is connected thereto.

From their forward ends the I-beams converge inwardly to points 6, from which points they diverge to separate them a greater extent and extend rearwardly parallel with each other. The rear ends of the I-beams are connected by a cross-block 7, that receives the rear cross-spring. The I-beams are seated in the transverse apertured block 8, that is slipped onto the beams from their rear ends, and the block is formed with reduced ends 9, that pass through side rails 10. The side rails 10 are surmounted by a circular fifth-wheel ring 11, provided with a cross-bar 12, that lies upon the transverse block 8.

Between the rear ends of the I-beams and beneath the fifth-wheel ring is a filler-block 13, and between the I-beams and the side rails 10 are filler-blocks 14, that are supported upon a circular ring 15, concentric with the fifth-wheel ring.

16 are straps bolted to the side rails 10, designed to strengthen said rails.

Extending transversely of the I-beams 1 and side rails 10 is a cross-beam 17, of angle shape in cross-section, (see Figs. IV and V,) that contains a wooden filler 18. This cross-beam is bolted to the I-beams and bears against the side rails 10, to which it is connected by straps 19, extending rearwardly from a cross-bar 20, bolted to the under side of the cross-beam so as to form a part thereof. The cross-bar 20 is provided with ears 21, that receive the side springs, on which the running-gear is supported.

I claim as my invention—

A running-gear comprising a pair of I-beams converging inwardly from their forward ends diverging from their middle part, and parallel at their rear ends, the tie-straps and bolts whereby the I-beams are secured together at their forward ends while the tongue is supported by the upper and lower flanges of the forward ends, the transverse apertured block slipped onto the rear ends of the I-beams, the fifth-wheel ring supported on the I-beams having a cross-bar supported on the transverse block, the side bars acting as stays and supported from the fifth-wheel and transverse block, and the angle-shaped cross-beams and cross-bar strapped to the side bars; substantially as described.

ALEXANDER P. ROBINSON.

In presence of—
E. S. KNIGHT,
M. P. SMITH.